(12) United States Patent
Miyazaki

(10) Patent No.: US 8,346,771 B2
(45) Date of Patent: Jan. 1, 2013

(54) IMAGE MANAGEMENT APPARATUS, AND CONTROL METHOD AND A COMPUTER-READABLE STORAGE MEDIUM STORING A PROGRAM THEREFOR

(75) Inventor: Shigeyuki Miyazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 12/698,821

(22) Filed: Feb. 2, 2010

(65) Prior Publication Data

US 2010/0198803 A1    Aug. 5, 2010

(30) Foreign Application Priority Data

Feb. 5, 2009  (JP) ................................ 2009-024902
Nov. 10, 2009 (JP) ................................ 2009-257421

(51) Int. Cl.
*H04N 5/262* (2006.01)
*G06F 17/30* (2006.01)
(52) U.S. Cl. .................... 707/737; 348/333.05
(58) Field of Classification Search ............ 348/333.05; 707/737
See application file for complete search history.

(56) References Cited

U.S. PATENT DOCUMENTS

| 6,886,056 | B2 * | 4/2005 | Ohmura ........................... 710/62 |
| 6,990,637 | B2 * | 1/2006 | Anthony et al. ............... 715/851 |
| 7,009,643 | B2 * | 3/2006 | Nakamura et al. .......... 348/231.4 |
| 7,398,479 | B2 * | 7/2008 | Hooper et al. ................. 715/838 |
| 7,415,662 | B2 * | 8/2008 | Rothmuller et al. .......... 715/200 |
| 7,437,681 | B2 * | 10/2008 | Misawa et al. ................ 715/835 |
| 7,636,726 | B2 * | 12/2009 | Sato ....................................... 1/1 |
| 7,643,706 | B2 * | 1/2010 | Wagner et al. ................ 382/309 |
| 7,724,978 | B2 * | 5/2010 | Nonaka et al. ................. 382/254 |
| 7,801,674 | B2 * | 9/2010 | Asai .............................. 701/200 |
| 7,847,850 | B2 * | 12/2010 | Takagi et al. .............. 348/333.02 |
| 7,991,234 | B2 * | 8/2011 | Hamasaki et al. ............ 382/224 |
| 2005/0034084 | A1 * | 2/2005 | Ohtsuki et al. ................ 715/864 |
| 2005/0044100 | A1 * | 2/2005 | Hooper et al. ................ 707/102 |
| 2005/0050043 | A1 * | 3/2005 | Pyhalammi et al. ............. 707/6 |
| 2007/0223049 | A1 * | 9/2007 | Araya et al. .................. 358/302 |
| 2008/0089592 | A1 * | 4/2008 | Isomura ......................... 382/224 |
| 2008/0129835 | A1 * | 6/2008 | Chambers et al. .......... 348/231.2 |
| 2008/0133526 | A1 * | 6/2008 | Haitani et al. ..................... 707/7 |
| 2009/0106666 | A1 * | 4/2009 | Nomura ........................ 715/748 |
| 2009/0113350 | A1 * | 4/2009 | Hibino et al. ................. 715/853 |
| 2009/0119596 | A1 * | 5/2009 | Iwahara et al. ............... 715/730 |
| 2010/0284566 | A1 * | 11/2010 | Hisatomi et al. .............. 382/103 |

* cited by examiner

*Primary Examiner* — Jorge A Casanova
(74) *Attorney, Agent, or Firm* — Canon USA Inc IP Division

(57) ABSTRACT

The present invention is directed to searching for image files based on shooting times thereof from among image files which are managed in each of folders and preventing a user from misunderstanding search results due to displayed contents when the search results are displayed for each of the folders. An image management apparatus according to the present invention searches an image file that satisfies a search condition in which a shooting time thereof is set by a user operation from among a plurality of image files, reads the shooting time of the searched image file, acquires a range of the shooting times for each of folders, and updates and displays thumbnail images indicating the searched image files together with acquired range of the shooting times for each of the folders.

17 Claims, 17 Drawing Sheets

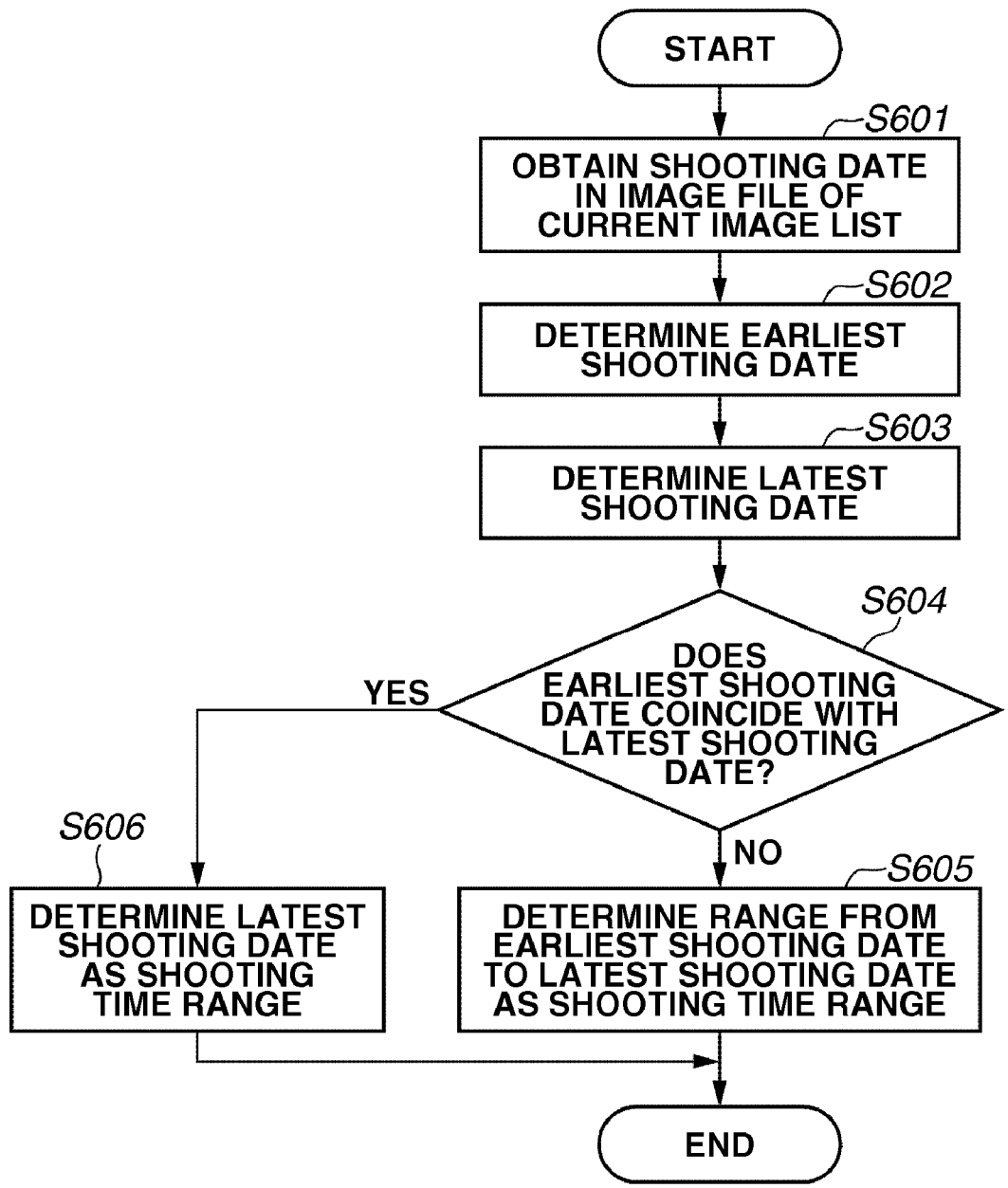

FIG.9A

CURRENT IMAGE LIST

| FILE NAME (901) | DISPLAY STATE (902) |
|---|---|
| IMG_0001.JPG | TO BE DISPLAYED |
| IMG_0002.JPG | TO BE DISPLAYED |
| IMG_0003.JPG | TO BE DISPLAYED |
| IMG_0004.JPG | TO BE DISPLAYED |
| IMG_0005.JPG | TO BE DISPLAYED |
| IMG_0006.JPG | TO BE DISPLAYED |

FIG.9B

TEMPORARY CURRENT IMAGE LIST

| FILE NAME | DISPLAY STATE |
|---|---|
| IMG_0001.JPG | TO BE DISPLAYED |
| IMG_0002.JPG | NOT TO BE DISPLAYED |
| IMG_0003.JPG | TO BE DISPLAYED |
| IMG_0004.JPG | NOT TO BE DISPLAYED |
| IMG_0005.JPG | TO BE DISPLAYED |
| IMG_0006.JPG | TO BE DISPLAYED |

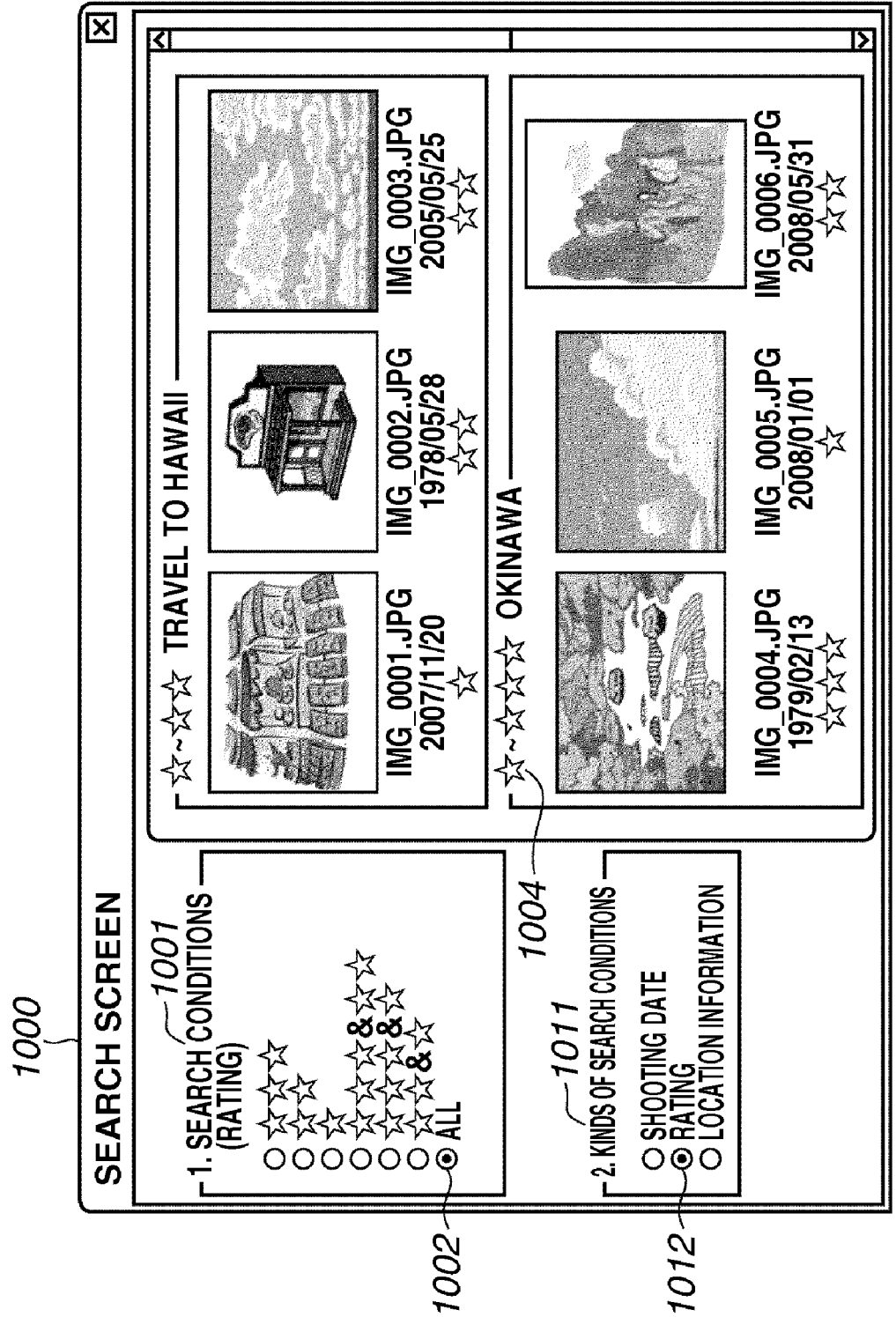

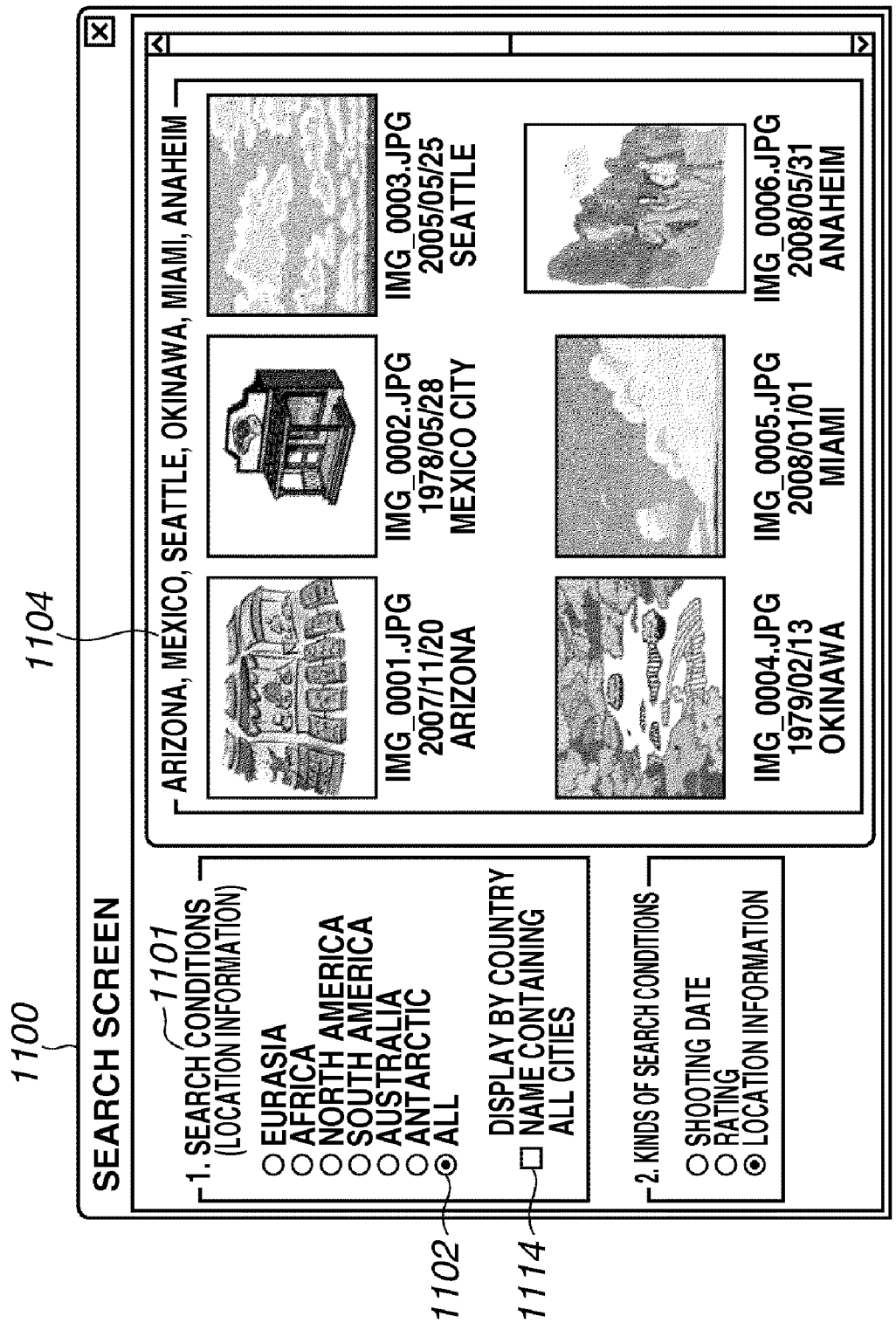

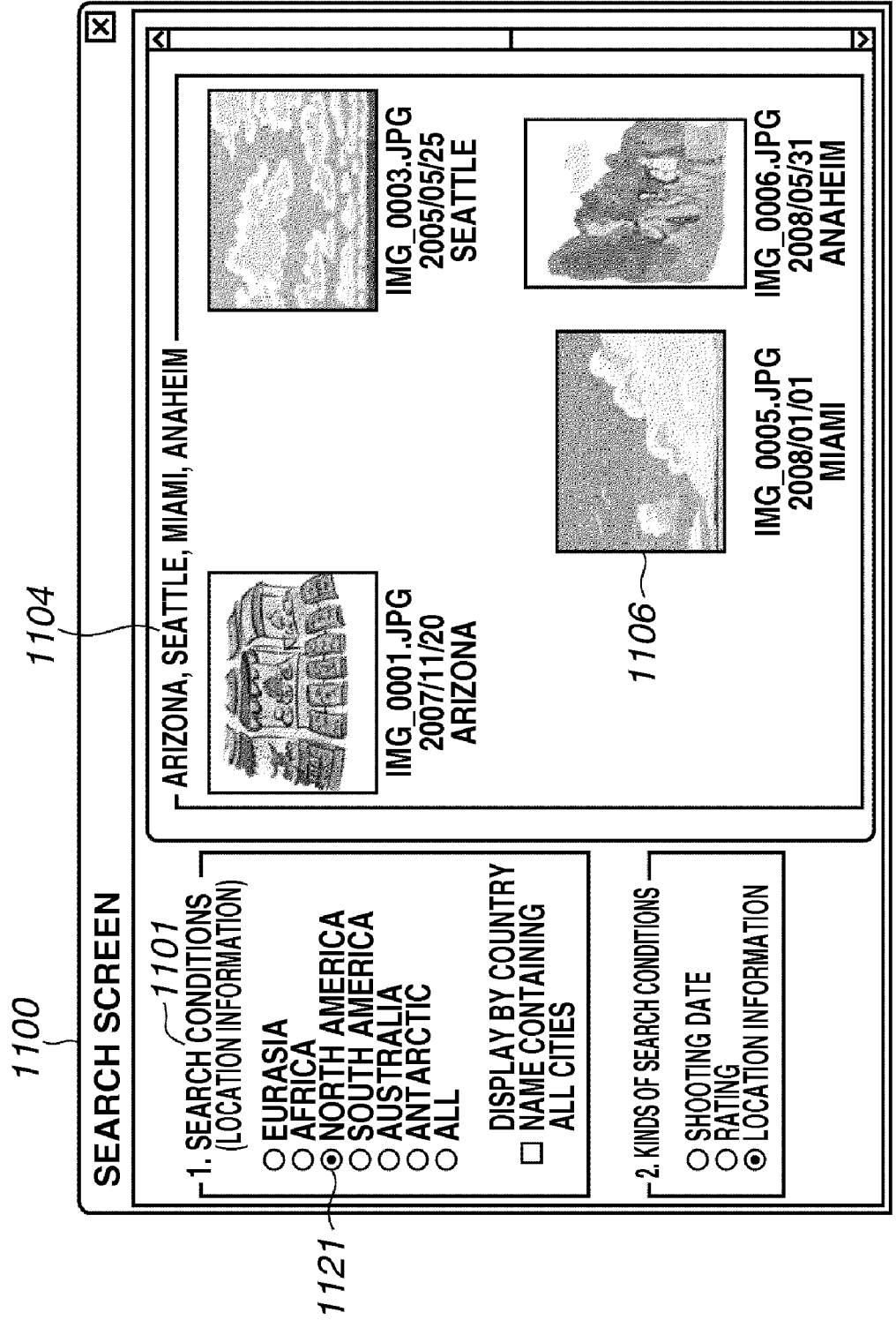

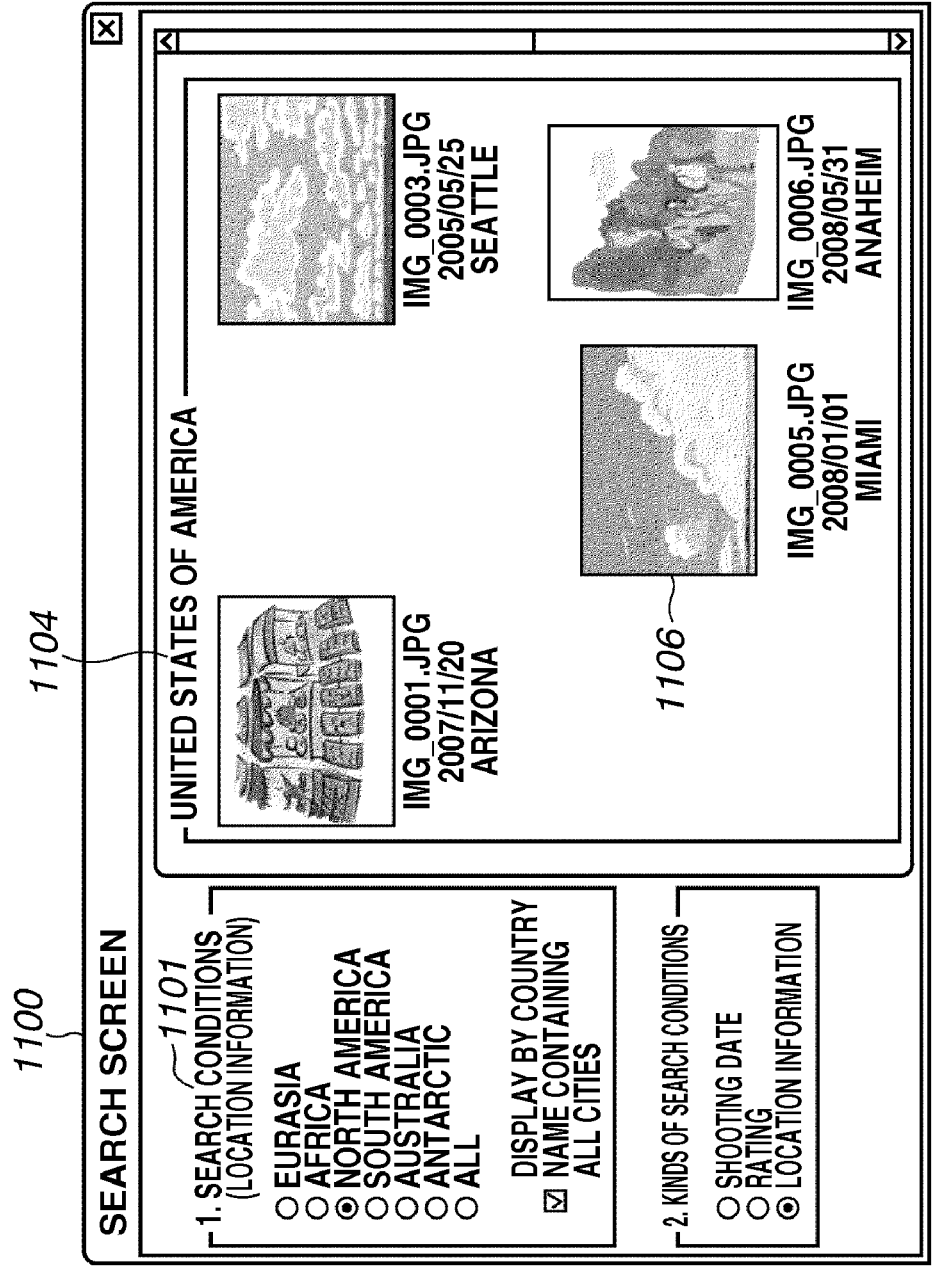

FIG.13

| CITY NAME | COUNTRY NAME | REGIONAL NAME |
|---|---|---|
| ARIZONA | UNITED STATES OF AMERICA | NORTH AMERICA |
| ANAHEIM | UNITED STATES OF AMERICA | NORTH AMERICA |
| JERUSALEM | ISRAEL | EURASIA |
| SEATTLE | UNITED STATES OF AMERICA | NORTH AMERICA |
| BARCELONA | SPAIN | EURASIA |
| BEIJING | CHINA | EURASIA |
| PRAGUE | CZECH | EURASIA |
| MIAMI | UNITED STATES OF AMERICA | NORTH AMERICA |
| MEXICO CITY | MEXICO | SOUTH AMERICA |
| LONDON | UNITED KINGDOM | EURASIA |

IMAGE MANAGEMENT APPARATUS, AND CONTROL METHOD AND A COMPUTER-READABLE STORAGE MEDIUM STORING A PROGRAM THEREFOR

BACKGROUND OF THE INVENTION

1. Field of the Invention

The present invention relates to a technique for searching an image satisfying a predetermined condition from a plurality of images and displaying the searched result.

2. Description of the Related Art

Until now, an image file stored in a hard disk of a computer apparatus has been managed on a folder basis and information indicating a folder and an image file stored in the folder is displayed as a list. Further, time information about the image file contained in the folder is detected to obtain time range from the earliest to the latest image, displaying the time range as attribute information of the folder.

When the image file satisfying the predetermined condition is searched from the image file stored in the hard disk of the computer apparatus and the searched result is displayed, displaying the searched image file on a folder basis enables a user to easily confirm the searched image file. An image file which does not satisfy the search condition is not displayed even if the image file is stored in the same folder, however, conventionally, the time range of all the image files contained in the folder has been displayed as the attribute information of the folder. Thus, the time range of actually searched image files does not coincide with that of the image files displayed as the attribute information of the folder, and it causes a problem that a user may misunderstand.

The present invention prevents a user from misunderstanding a search result by a displayed content when image files of attribute information which satisfy a predetermined condition are searched from image files which are managed on a folder basis, and the searched result is displayed on a folder basis.

SUMMARY OF THE INVENTION

The present invention is directed to prevent a user from misunderstanding a search result by a displayed content when image files are searched based on shooting time from the image files managed on a folder basis and the searched result is displayed on a folder basis.

According to an aspect of the present invention, an image management apparatus which manages a plurality of image files by classifying the image files into a plurality of folders includes a first acquisition unit configured to acquire shooting times of image files belonging to the folders, a display unit configured to display a list of thumbnail images indicating the image files belonging to the folders, along with a range of the shooting times of the image files belonging to the folders, on an area of a screen for each of the folders, a setting unit configured to set a condition for searching the image files in response to a user operation, a search unit configured to search the image files which satisfy the set search condition, a reading unit configured to read the shooting times of the searched image files, a second acquisition unit configured to acquire the range of shooting times of the searched image files among the image files belonging in the folder, for each of the folders based on the shooting times of the read image files, and an update unit configured to update the list of thumbnail images indicating the searched image files among the image files belonging in the folder and the range of the acquired shooting times, on the area of the screen for each of the folders.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flow chart illustrating an example of an operation procedure by which the information processing apparatus according to the present invention obtains a range of shooting time.

FIGS. 9A and 9B illustrate examples of current image lists according to the present invention.

FIGS. 10A and 10B illustrate examples of search screens according to the present invention.

FIGS. 11A, 11B, and 11C illustrate examples of search screens according to the present invention.

FIG. 13 illustrates an example of database according to the present invention.

DESCRIPTION OF THE EMBODIMENTS

Various exemplary embodiments, features, and aspects of the invention will be described in detail below with reference to the drawings.

The exemplary embodiment of the present invention is described below with reference to the drawings. It is to be understood that components described in the exemplary embodiment are merely examples and the scope of the present invention is not limited only to the components.

Figure 1:
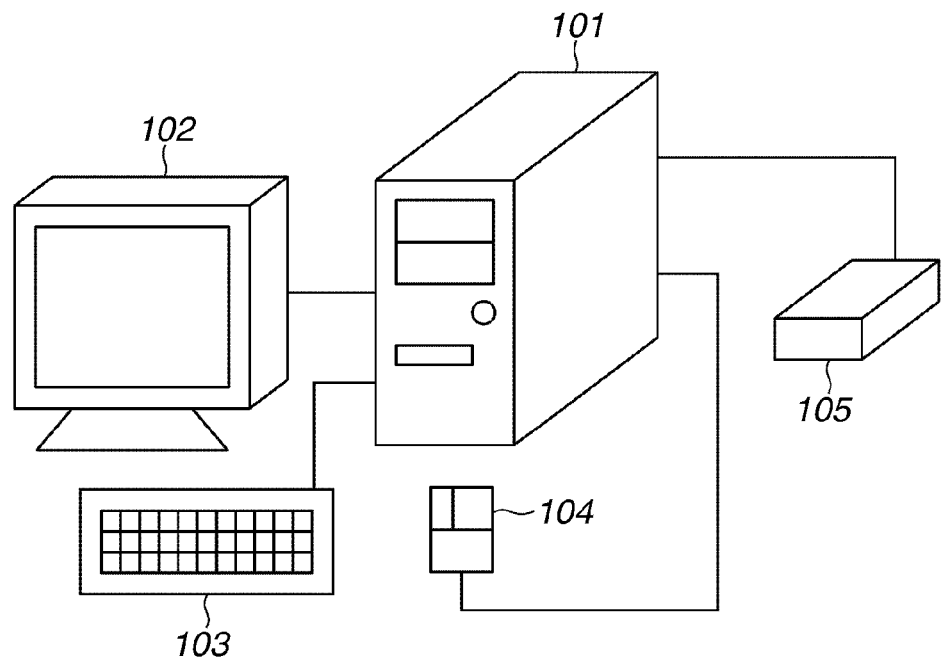
FIG. 1 is a schematic diagram illustrating an example of a configuration of an image management system according to the present invention.

FIG. 1 illustrates an example of a configuration of an image management system according to a first exemplary embodiment. An image management system 100 includes an information processing apparatus 101. The information processing apparatus 101 is connected to a display device 102, an input device such as a keyboard 103 and a pointing device 104, and an external storage device 105 such as a hard disk and a memory card. The external storage device 105 stores an image management program according to the present exemplary embodiment.

The information processing apparatus 101 reads the image management program in the external storage device 105 and executes the image management program. The external storage device 105 stores a plurality of image files associated with folders which have a hierarchical structure. The information processing apparatus 101 draws an image on the display device 102 to inform a user of a message or a status of the image management system 100.

The user of the image management system 100 inputs its response or instructions for a message displayed on the display device 102 using the keyboard 103 and the pointing device 104. The information processing apparatus 101 can rewrite data recorded in the external storage device 105 in accordance with the program read from the external storage device 105.

Figure 2:
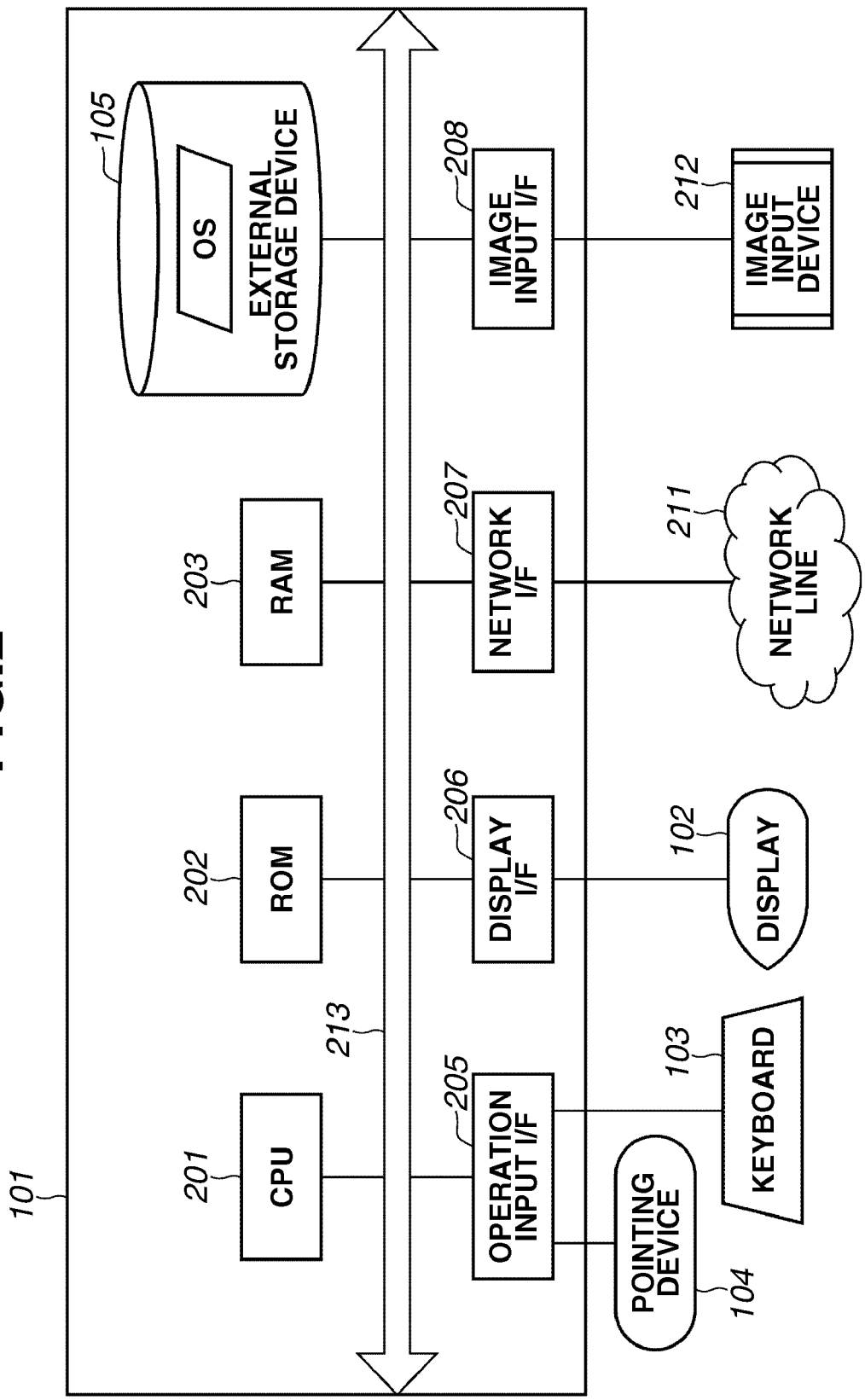
FIG. 2 is a block diagram illustrating an example of a configuration of an information processing apparatus according to the present invention.

FIG. 2 illustrates an example of a configuration of the information processing apparatus 101 according to the present exemplary embodiment. A central processing unit (CPU) 201 controls the entire information processing apparatus 101. A read only memory (ROM) 202 stores programs and parameters which do not need to be modified. A random access memory (RAM) 203 temporarily stores a program and data supplied from an external device.

The external storage device 105 includes a hard disk or a memory card fixedly installed in the information processing apparatus 101 or an optical disk, a magnetic or an optical card, and an IC card which are detachable from the information processing apparatus 101. An interface 205 is coupled with an input device such as the pointing device 104 and the key board 103 for receiving a user's operation and inputting data. An interface 206 is coupled with the display device 102 for displaying data stored in the information processing apparatus 101 or supplied data. A network interface 207 connects the information processing apparatus 101 to a network circuit such as the Internet. A system bus 213 communicably connects the units 201 to 207 with each other.

The information processing apparatus 101 according to the present exemplary embodiment may be realized by a single computer apparatus or each function thereof may be distributed to a plurality of computer apparatuses if required. If the information processing apparatus 101 is configured by the plurality of computer apparatuses, the computer apparatuses are communicably connected to each other via a local area network (LAN).

Figure 3:
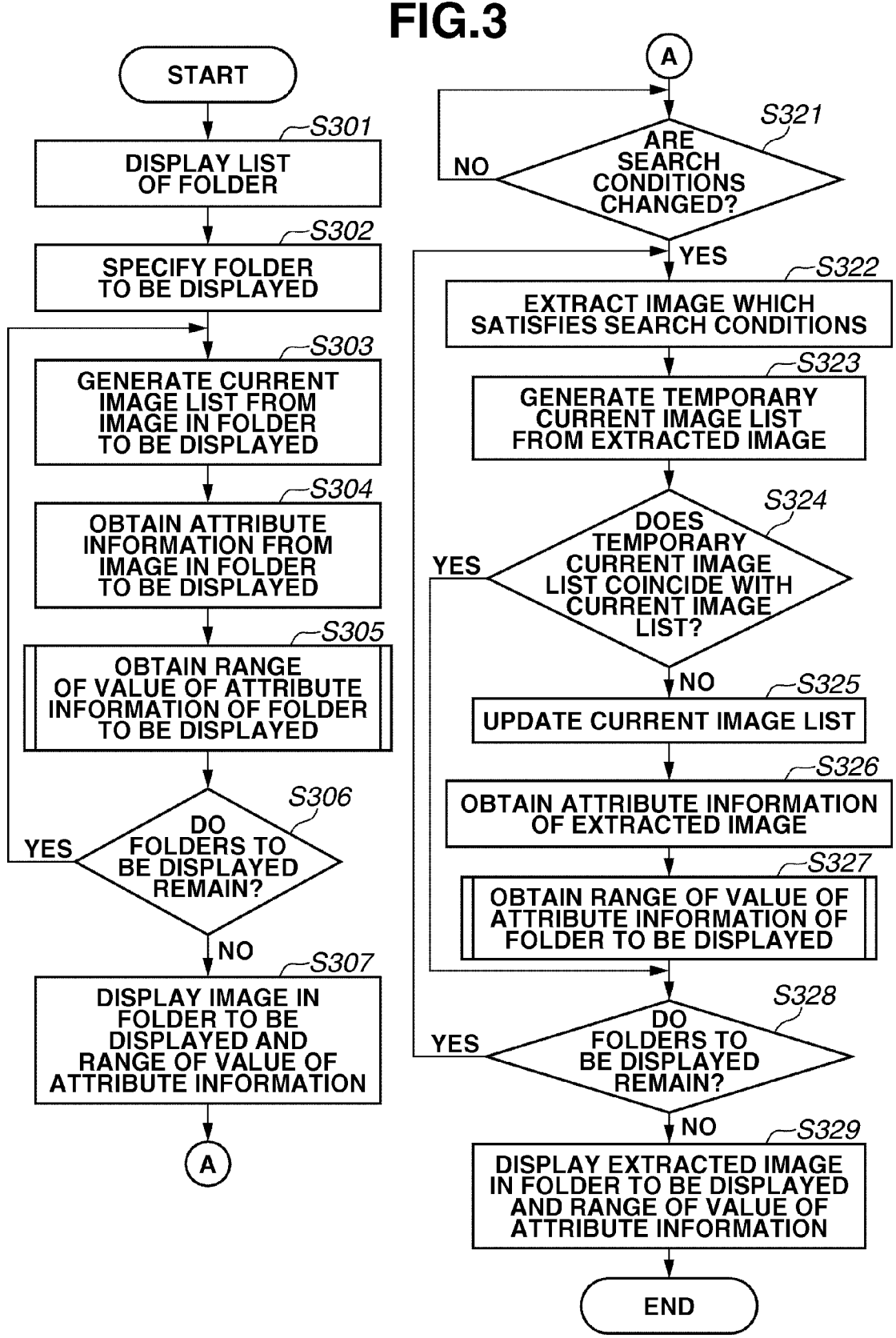
FIG. 3 is a flow chart illustrating an example of an operation procedure by which the information processing apparatus according to the present invention displays a plurality of images on a display device.

An operation in which the information processing apparatus 101 starts the image management program and displays a plurality of images on the display device 102 is described below with reference to a flow chart in FIG. 3. The following operation is realized by the CPU 201 of the information processing apparatus 101 controlling each module according to the image management program or an operation system (OS) stored in the external storage device 105.

In step S301, the information processing apparatus 101 displays a list of information indicating image files stored in the external storage device 105 on a folder basis with reference to the external storage device 105.

Figure 4:
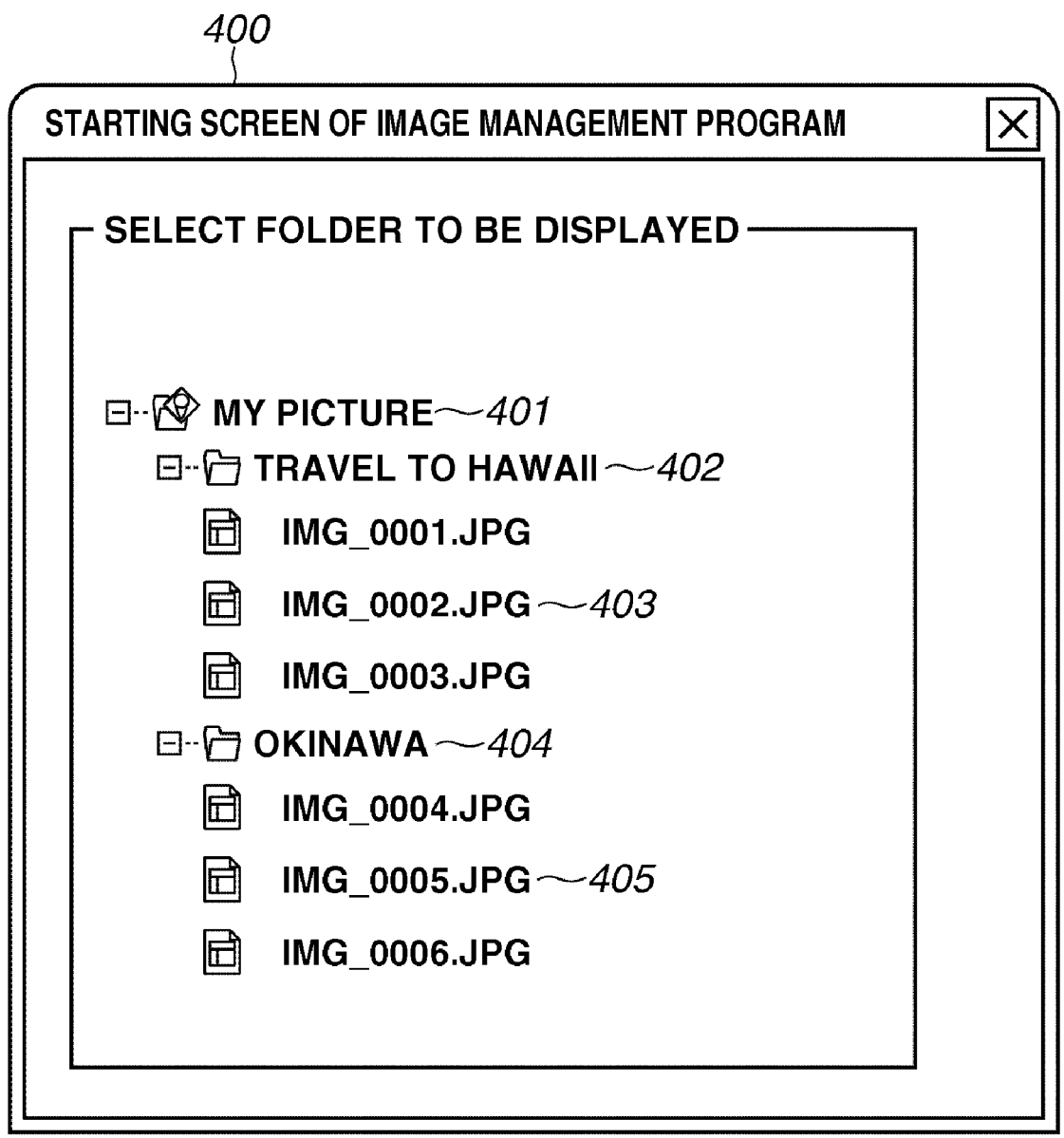
FIG. 4 illustrates an example of a starting screen of an image management program according to the present invention.

FIG. 4 illustrates a state in which a list of information indicating image files is displayed on a starting screen of the image management program on a folder basis. A user selects a folder to be narrowed down and displayed from among the folders using the input device. Searching and displaying processing will be described below. In FIG. 4, a folder "Travel to Hawaii" 402 and a folder "Okinawa" 404 are placed on a hierarchy immediately beneath a folder "My picture" 401 and image files 403 and 405 are stored in the folders respectively.

Figure 5:
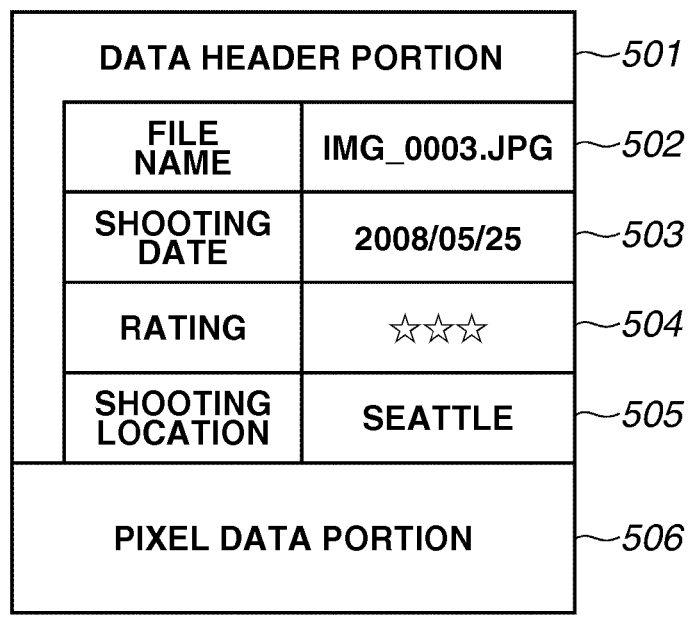
FIG. 5 illustrates an example of a configuration of an image file according to the present invention.

The image files 403 and 405 include not only image data but also a data header on which predetermined attribute information such as shooting information related to shooting condition of an image is recorded. FIG. 5 illustrates an example of a configuration of an image file. An image file 500 includes a data header portion 501 and a pixel data portion 506. The data header portion 501 includes a file name 502, a rating 504, and shooting information (shooting date 503 and shooting location 505). The pixel data portion 506 stores a pixel value for displaying an image file as a photo. The rating 504 refers to a rating for indicating an evaluation in which a user rates quality of photographed image data.

Although the present exemplary embodiment describes the case where the attribute information is contained in an image file, the attribute information and the image file may be stored separately from each other as long as the attribute information is stored by being associated with the image file.

In step S302, the information processing apparatus 101 specifies a folder to be displayed on a search screen in response to a user's operation. In step S303, the information processing apparatus 101 reads all the image files included in one of the folders specified in step S302 from the external storage device 105, describes information indicating the image files to generate a current image list, and stores the current image list.

As illustrated in FIG. 9A, the current image list includes a file name 901 for uniquely discriminating an image file and information indicating whether the image file is displayed on the search screen. At this point, all the image files are displayed on the search screen, so that a display state 902 of all the image files is represented by "to be displayed."

In step S304, the information processing apparatus 101 reads the attribute information of the image file contained in the current image list generated in step S303. In the present exemplary embodiment, there is described the case where a shooting time among the attribute information is read. In step S305, the information processing apparatus 101 obtains a range of shooting time of the image files contained in the folder from the shooting time obtained in step S304. The process executed in step S305 is described later with reference to FIG. 6.

In step S306, the information processing apparatus 101 determines whether all the folders specified in step S302 are processed. If folders yet to be processed remain (NO in step S306), the process is repeated in steps S303 to S305. In the present exemplary embodiment, the folder "Travel to Hawaii" 402 and the folder "Okinawa" 404 are specified in step S302. These folders are sequentially processed in steps S303 to S305.

In step S303, the information processing apparatus 101 generates the current image list to discriminate a folder to which an image file belongs. For example, the current image list may be generated on a folder basis or a folder to which an image file belongs may be discriminably described in the same current image list.

In step S307, the information processing apparatus 101 displays on the search screen a thumbnail image of the image file of the current image list generated in step S303 along with the range of shooting time obtained in step S305 on a folder basis.

Figure 7A:
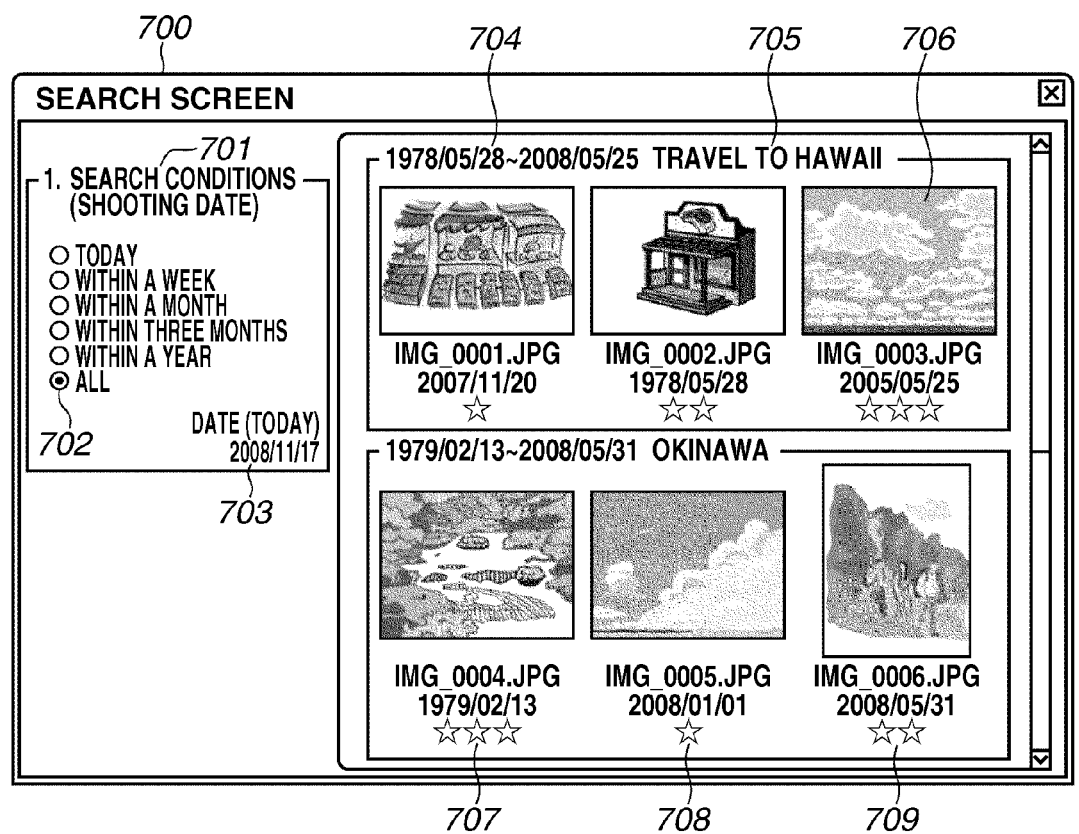
FIGS. 7A and 7B illustrate examples of search screens according to the present invention.

FIG. 7A illustrates an example of a search screen 700 displayed in step S307. Search conditions have not been set yet and all the image files in the folders specified in step S302 are displayed, so that a radio button "All" 702 for a search condition 701 is turned on.

Today's date 703 is obtained from system time. In the search screen 700, an area for displaying data is separated on a folder basis. The search screen 700 includes the range of shooting time 704 of the folder obtained in step S305, a folder name 705, a thumbnail image 706 corresponding to an image file of a folder, a name of an image file 707, a shooting time of an image file 708, and a rating of an image file 709. Attribute information in addition to the above information may be displayed.

In step S321, the information processing apparatus 101 determines whether search conditions are changed. If search conditions are changed (YES in step S321), the processing proceeds to step S322. In step S322, the information processing apparatus 101 searches from the external storage device 105 the image file which belongs to one of the folders specified in step S302 and satisfies the changed search conditions changed and reads the searched image file.

In step S323, the information processing apparatus 101 describes information indicating the image file read in step S322 to generate a temporary current image list. Then in step S324, the information processing apparatus 101 compares the temporary current image list with a current image list to determine whether the temporary current image list coincides with the current image list. As illustrated in FIG. 9B, in the temporary current image list, the image file which does not satisfy the search conditions is not displayed on the search screen, so that the display state is represented by "not to be displayed."

If the temporary current image list does not coincide with the current image list (NO in step S324), in step S325, the information processing apparatus 101 overwrites the current image list with the temporary current image list to update the current image list. In step S326, the information processing apparatus 101 obtains the shooting time of the image files contained in the current image list updated in step S325.

In step S327, the information processing apparatus 101 obtains the range of shooting time of the image files contained in the folder from the shooting time obtained in step S326. In step S328, the information processing apparatus 101 determines whether all the folders specified in step S302 are processed. If folders yet to be processed remain (NO in step S328), the process is repeated in steps S322 to S327.

In step S329, the information processing apparatus 101 displays on the search screen a thumbnail image of the image file of the current image list updated in step S325 along with the range of shooting time obtained in step S327 on a folder basis. Thus, contents displayed on the search screen are changed over according to the change of search conditions.

Figure 7B:
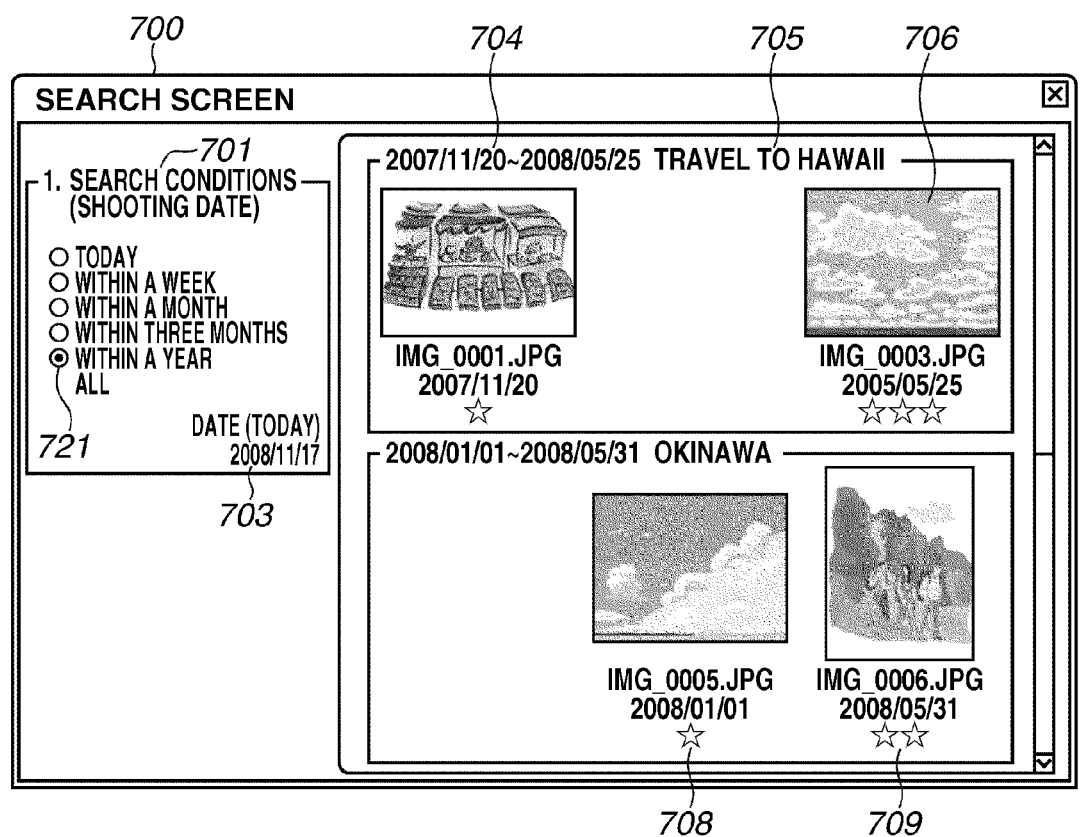

FIG. 7B illustrates an example of the search screen 700 displayed in step S329. The shooting time as the search condition is set to "within a year" 721. Only the thumbnail images 706 corresponding to the image files with the shooting time of the past one year are displayed and the thumbnail images corresponding to the image files with the shooting time earlier than the past one year are not displayed. The range of shooting time 704 of the folder is the range obtained in step S327, in other words, the range of shooting time of the image file is displayed.

The processing for obtaining the range of shooting time executed in steps S305 and 5327 is described below with reference to FIG. 6.

In step S601, the information processing apparatus 101 obtains information about shooting time from the data header portion 501 of the image file whose display state is represented by "to be displayed" in the current image list. In step S602, the information processing apparatus 101 compares all the obtained shooting time with each other and determines the earliest shooting time. In step S603, the information processing apparatus 101 determines the latest shooting time.

In step S604, the information processing apparatus 101 determines whether the earliest shooting time coincides with the latest shooting time. If the earliest shooting time coincides with the latest shooting time (YES in step S604), then in step S606, the information processing apparatus 101 sets the latest shooting time to the range of shooting time. If the earliest shooting time does not coincide with the latest shooting time (NO in step S604), then in step S605, the information processing apparatus 101 sets the earliest to the latest shooting time to the range of shooting time.

In FIG. 7A, all the image files in the folder "Travel to Hawaii" 402 are displayed. Therefore, the range of shooting time is from May 28, 1978, which is the shooting date of an image file "IMG_0002.JPG" photographed earliest, to May 25, 2008, which is the shooting date of an image file "IMG_0003.JPG" photographed latest.

In FIG. 7B, on the other hand, the image files photographed in the past one year among the image files in the folder "Travel to Hawaii" 402 are displayed. Therefore, the range of shooting time is from Nov. 20, 2007, which is the shooting time of an image file "IMG_0001.JPG" photographed earliest in the image files, to May 25, 2008, which is the shooting time of the image file "IMG_0003.JPG" photographed latest.

Although the shooting time among the attribute information is used as a search condition in the above description, other attribute information such as the rating or the location information, for example, may be used to narrow down image files to be displayed and display a list of thumbnail images of the extracted image files.

If the information processing apparatus 101 determines that other attribute information except shooting time is set as a search condition, the process in step S327 for obtaining the range of shooting time of the extracted image file may be omitted. In step S329, the range of shooting time of all the images in the folder obtained in step S305 and displayed in step S307 may be displayed as it is without updating the range.

Accordingly, a user can continue recognizing the range of shooting time of all the images in a folder as information about the folder when image files are narrowed down by other attribute information except shooting time, which enhances convenience.

In the above description, although the shooting time among the attribute information is used to calculate the range of shooting time on a folder basis and display it on the search screen on a folder basis, a similar effect can be achieved by using other attribute information. The following is an example where rating and location information are used as the attribute information instead of shooting time.

FIG. 10A illustrates an example of a search screen 1000 which uses the rating among the attribute information as the attribute information. A search condition 1001 denotes the rank of "rating." Since all the image files are displayed, a radio button "all" 1002 is turned on. Radio buttons for switching kinds of the search condition 1001 are displayed on a field 1011. In FIG. 10A, a "rating" 1012 is turned on.

Figure 10B:
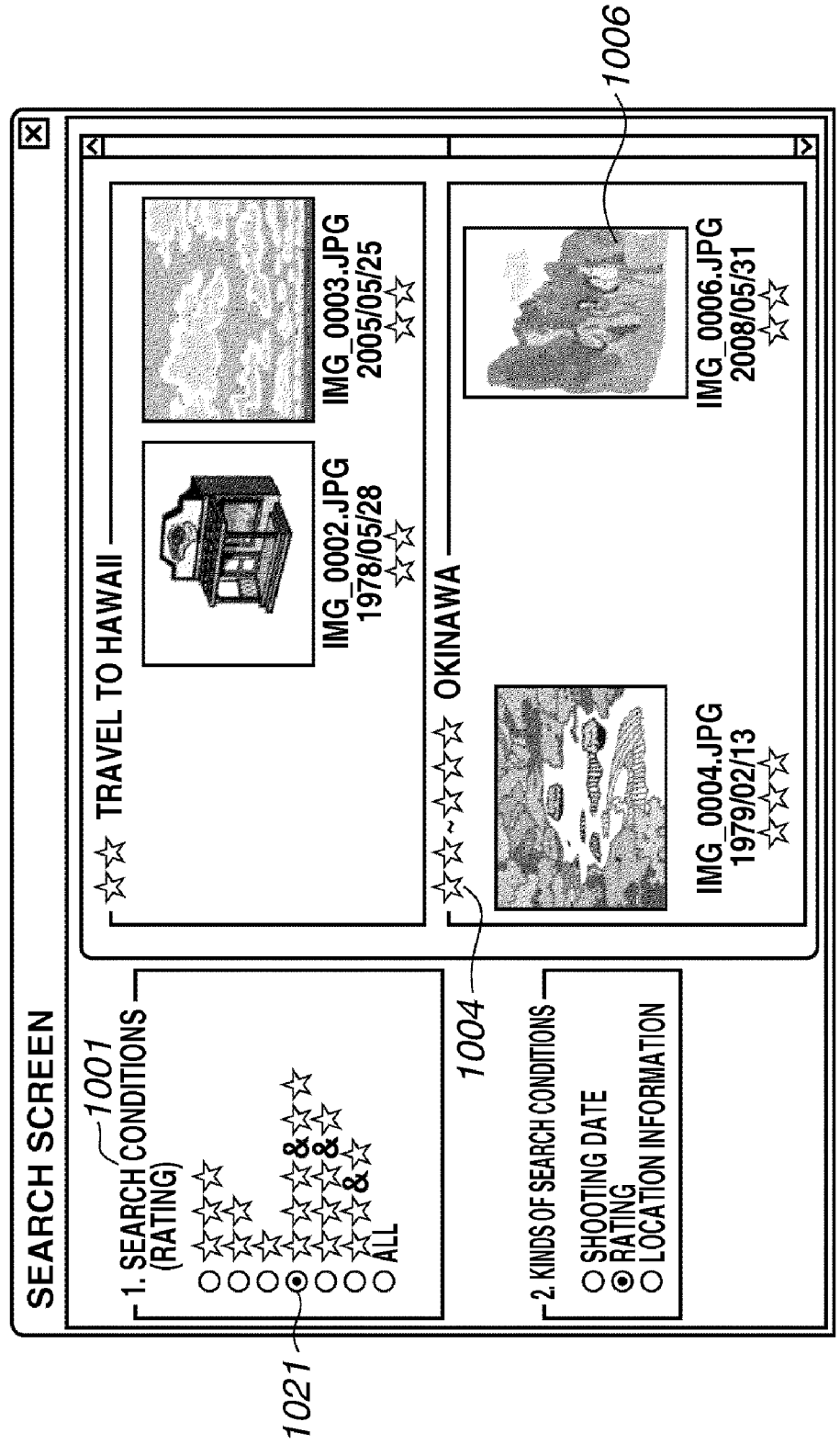

FIG. 10B illustrates an example of the search screen 1000 the content of which is changed according to the change of search conditions. Here, "three and two stars" 1021 is set as the search condition. Only thumbnail images 1006 corresponding to the image files with three or two stars denoting the rating are displayed. The thumbnail images corresponding to the image files which do not fit the search condition are not displayed.

Figure 8:
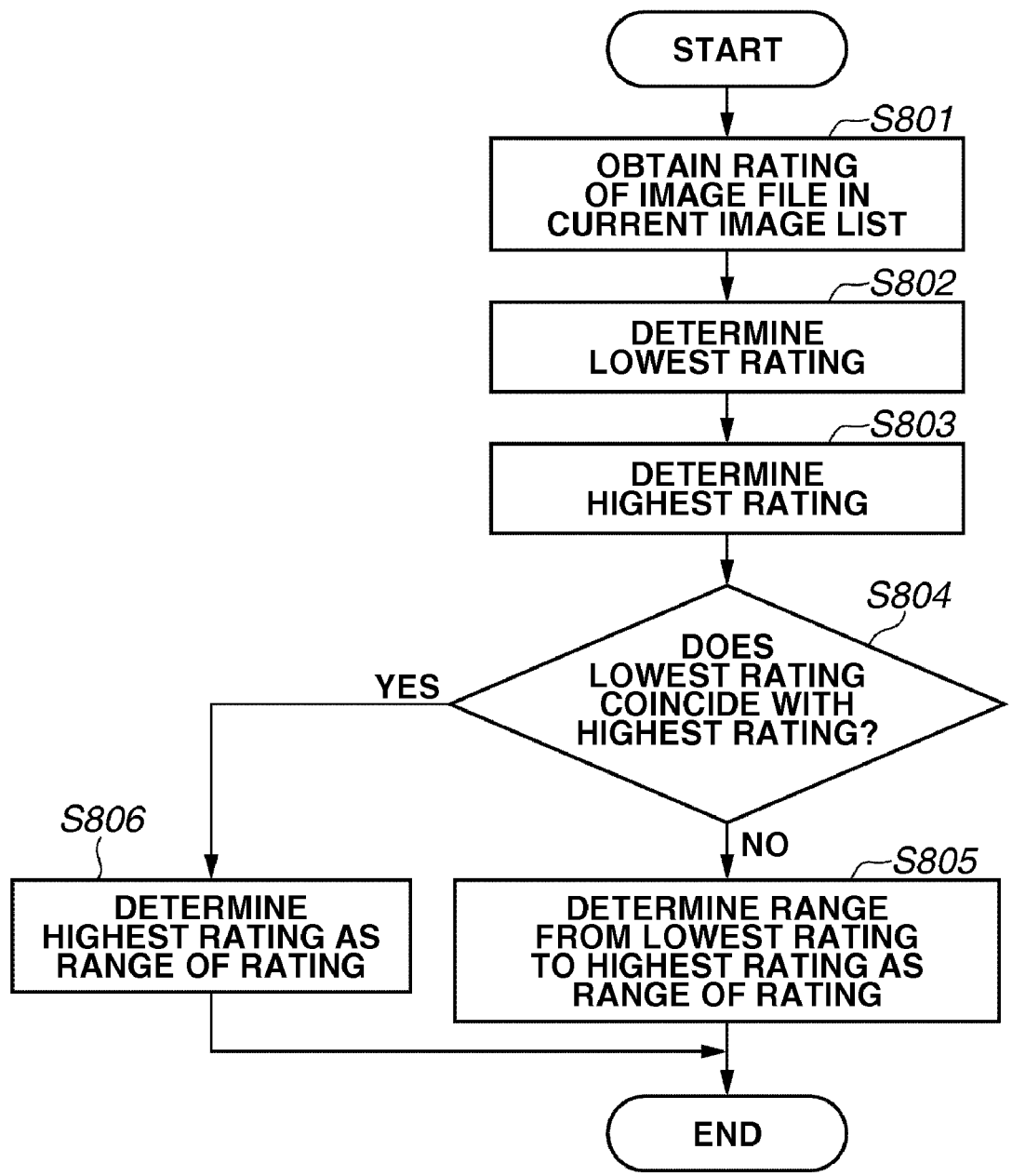
FIG. 8 is a flow chart illustrating an example of an operation procedure by which the information processing apparatus according to the present invention obtains a range of rating.

The processing for obtaining a range of the rating executed in steps S305 and S327 in using the rating as the attribute information is described below with reference to FIG. 8.

In step S801, the information processing apparatus 101 obtains information about the rating from the data header portion 501 of the image file whose display state is represented by "to be displayed" in the current image list. In step S802, the information processing apparatus 101 compares all the obtained ratings with each other and determines the lowest rating as the lowest value. In step S803, the information processing apparatus 101 determines the highest rating as the highest value.

In step S804, the information processing apparatus 101 determines whether the lowest value coincides with the highest value. If the lowest value coincides with the highest value (YES in step S804), in step S806, the information processing apparatus 101 sets the highest value to the range of the rating. If the lowest value does not coincide with the highest value (NO in step S804), in step S805, the information processing apparatus 101 sets the lowest to the highest value to the range of the rating.

FIG. 10A illustrates the search screen 1000 displayed in step S307. All the image files in the folder "Okinawa" 404 are displayed. Therefore, the range of the rating 1004 is from one star provided for an "IMG_0005.JPG" which is the lowest in evaluation to three stars provided for an "IMG_0004.JPG" which is the highest in evaluation.

FIG. 10B illustrates the search screen 1000 displayed in step S329. The rating as a search condition is set to "three and two stars" 1021. The image files with three or two stars among the image files in the folder "Okinawa" 404 are displayed. Therefore, the range of the rating 1004 is from two stars provided for an "IMG_0006.JPG" which is the lowest in evaluation in them to three stars provided for the "IMG_0004.JPG" which is the highest in evaluation.

In the following, a case is described where location information among attribute information is used. In the present exemplary embodiment, a city name as location information is recorded on the data header portion 501 of the image file. The location information may be information indicating location where a photographing apparatus exists in shooting or information indicating location where an object exists.

FIG. 11A illustrates an example of the search screen 1100. A search condition 1101 is "location information." Since all the image files are displayed, a radio button "all" 1102 is turned on.

FIG. 11B illustrates an example of the search screen 1100 the content of which is changed according to the change of search conditions. Here, "North America" 1121 is set as a search condition. Only thumbnail images 1106 corresponding to the image files with city names included in North America are displayed. The thumbnail images corresponding to the image files which do not fit the search condition are not displayed.

FIG. 11C illustrates the search screen 1100 indicating a country name instead of a city name if a check box 1114 is turned on and there is a country name including city names provided for the image file to be displayed.

Figure 12:
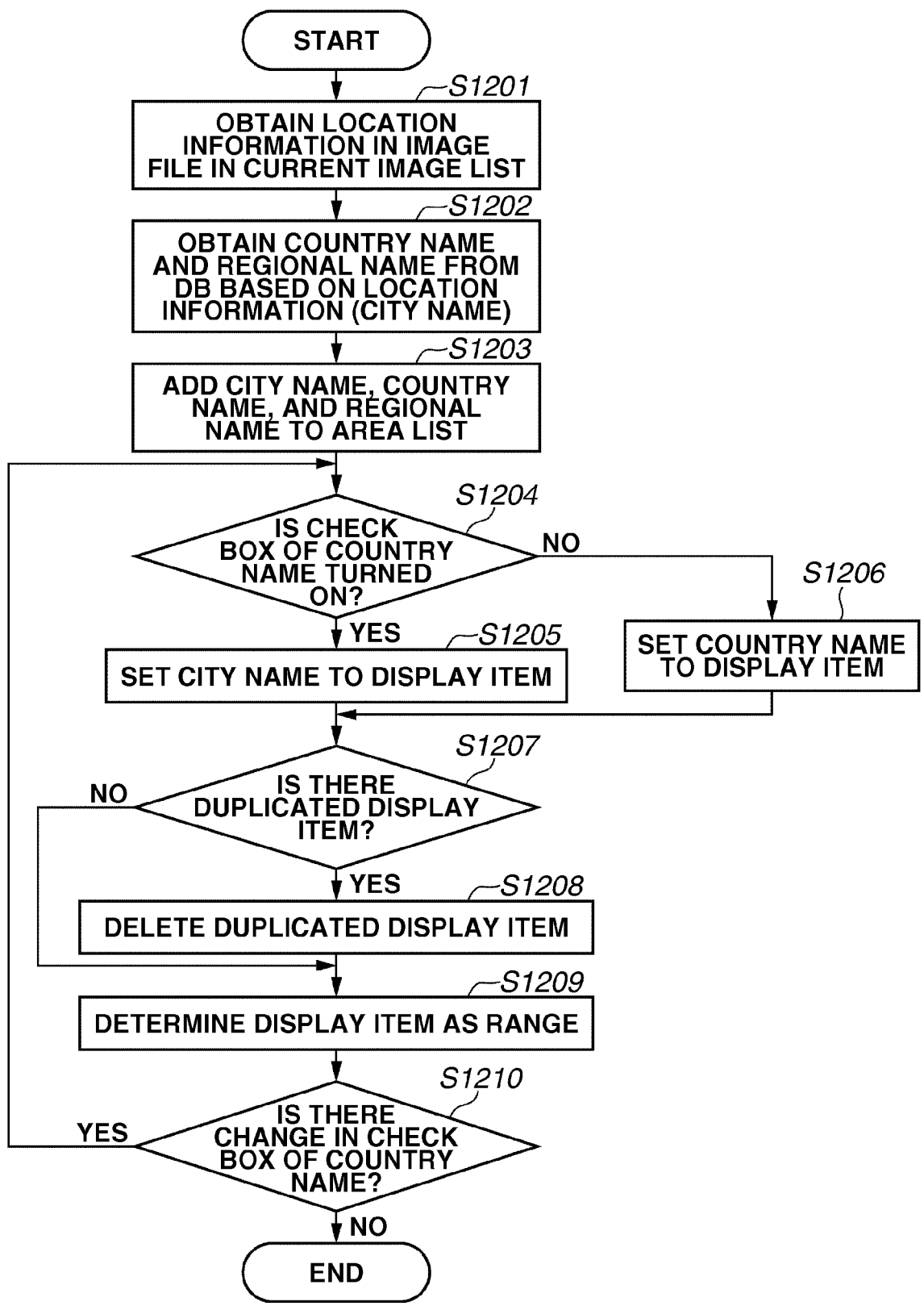
FIG. 12 is a flow chart illustrating an example of an operation procedure by which the information processing apparatus according to the present invention obtains a range of location information.

There is described below the process for obtaining a range of location information, executed in steps S305 and S327 when location information (city name) is used as the attribute information, with reference to FIG. 12.

In step S1201, the information processing apparatus 101 obtains location information from the data header portion 501 of the image file whose display state is represented by "to be displayed" in the current image list. In step S1202, the information processing apparatus 101 obtains a corresponding country name or regional name from a database 1300 based on location information. FIG. 13 illustrates an example of data stored in the database 1300. The database 1300 manages city names classified by country names and regional names.

In step S1203, the information processing apparatus 101 adds the obtained country names and regional names to an area list along with city names. In step S1204, the information processing apparatus 101 determines whether the check box 1114 is turned on. If the check box 1114 is turned on (YES in step S1204), in step S1205, a city name in the area list is set to a display item. If the check box 1114 is turned off (NO in step S1204), in step S1206, a country name in the area list is set to the display item.

In step S1207, the information processing apparatus 101 determines whether there is a duplicated display item. If there is the duplicated display item (YES in step 1207), in step S1208, the duplicated display item is deleted. In step S1209, the information processing apparatus 101 sets the display item to the range of location information. In step S1210, the information processing apparatus 101 confirms whether there is any change in the state of the check box. If there is any change (YES in step S1210), the process returns to step S1204.

FIG. 11A illustrates the search screen 1100 displayed in step S307. In FIG. 11A, a folder "Travel" which is placed on the hierarchy immediately beneath the folder "My picture" is the folder to be displayed. A plurality of image files which includes the local information belongs to the folder "Travel", and "Arizona, Mexico, Seattle, Okinawa, Miami, and Anaheim" excluding duplication among the city names of each image file are displayed on the range of location information 1104.

FIG. 11B illustrates an example of the search screen 1100 displayed in step S329. The location information as a search condition is set to "North America" 1121. There are displayed the image files with the city names associated with "North America" in the data base 1300 among the image files in the folder "Travel". Therefore, "Arizona, Seattle, Miami, and Anaheim" are displayed on the range of location information 1104.

FIG. 11C also illustrates an example of the search screen 1100 displayed in step S329. As is the case with FIG. 11B, the location information as a search condition is set to "North America" 1121, however, the image files with the country name associated with "North America" in the data base 1300 are displayed, so that "United States Of America" is displayed on the range of location information 1104.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-024902 filed Feb. 5, 2009 and No. 2009-257421 filed Nov. 10, 2009, which are hereby incorporated by reference herein in their entirety.

What is claimed is:

1. An image management apparatus which manages a plurality of image files by classifying the image files into a plurality of folders, the image management apparatus comprising:

at least one processor coupled via a bus to a memory, the processor being programmed to control:
a first acquisition unit configured to acquire shooting times of the image files belonging to the folders;
a display unit configured to display a first list of thumbnail images indicating the image files belonging to the folders and a first range of the shooting times of the image files, on an area of a screen for each of the folders;
a setting unit configured to set a condition for searching the image files in response to a user operation;
a search unit configured to search the image files which satisfy the set search condition;
a reading unit configured to read the shooting times of the searched image files for each folder;
a second acquisition unit configured to acquire a second range of shooting times of the searched image files among the image files belonging to the folders, for each folder based on the read shooting times of the searched image files; and
an update unit configured to update the first list to a second list of thumbnail images to indicate the searched image files among the image files belonging to the folders and the first range of the shooting times in the second range of shooting times acquired by said second acquisition unit, on the area of the screen for each of the folders, wherein said display unit displays the second list and the second range of the shooting times on the area of the screen for each of the folders after the setting unit sets the condition.

2. The image management apparatus according to claim 1, wherein the search condition includes at least one of rating and location information,
wherein the image management apparatus further comprises a determination unit configured to determine whether the search condition set by the setting unit is shooting time, and
wherein the update unit does not update the first range of the shooting time if the set search condition is not the shooting time as a result of the determination of the determination unit.

3. A method for controlling an image management apparatus which manages a plurality of image files by classifying them into a plurality of folders, the method comprising:
acquiring shooting times of the image files belonging to the folders;
displaying a first list of thumbnail images indicating the image files belonging to the folders, along with a first range of the shooting times of the image files belonging to the folders, on an area of a screen for each of the folders;
setting a condition for searching the image files in response to a user operation;
searching the image files which satisfy the set search condition;
reading the shooting times of the searched image files for each folder;
acquiring a second range of shooting times of the searched image files among the image files belonging to the folder for each of the folders based on the read shooting times of the searched image files; and
updating the first list to a second list of thumbnail images indicating the searched image files among the image files belonging to the folders and the first range of the shooting times in the second range of the acquired shooting times acquired by the second acquisition unit, on the area of the screen for each of the folders, wherein the display unit displays the second list and the second range of the shooting times on the area of the screen for each of the folders after the setting unit sets the condition.

4. The method of claim 3, wherein setting the condition for searching the image files in response to the user operation, wherein the user operation of setting the condition is performed on a second area of the screen which is distinct from the area of the screen for each of the folders.

5. A non-transitory computer-readable storage medium storing a program causing a computer to execute a method, the computer realizing an image management apparatus which manages a plurality of image files by classifying them into a plurality of folders, the method comprising:
acquiring shooting times of the image files belonging to the folders;
displaying a first list of thumbnail images indicating the image files belonging to the folders, along with a first range of the shooting times of the image files belonging to the folders, on an area of a screen for each of the folders;
setting a condition for searching the image files in response to a user operation;
searching the image files which satisfy the set search condition;
reading the shooting times of the searched image files for each folder;
acquiring a second range of shooting times of the searched image files among the image files belonging to the folder for each of the folders based on the read shooting times of the searched image files; and
updating the first list to a second list of thumbnail images indicating the searched image files among the image files belonging to the folders and the first range of the shooting times in the second range of the acquired shooting times acquired by the second acquisition unit, on the area of the screen for each of the folders, wherein the display unit displays the second list and the second range of the shooting times on the area of the screen for each of the folders after the setting unit sets the condition.

6. A method for managing a plurality of image files, wherein the plurality of image files are dispersed among a plurality of folders, the plurality of folders comprise a first folder and a second folder, each image file among the plurality of image files has attribute information associated with each image file, the method comprising:
displaying the first folder, in a first area;
displaying a first range of attribute information associated with all of the image files in the first folder, in the first area;
displaying the second folder, in a second area;
displaying a third range of attribute information associated with all of the image files in the second folder, in the second area;
setting a search criteria for the plurality of image files,
wherein, a global subset of image files are those image files among the plurality of image files that match the search criteria;
wherein, a first subset of image files are the global subset of image files that are in the first folder; and
wherein, a second subset of image files are the global subset of image files that are in the second folder;

replacing in the first area, the first range with a second range of attribute information associated with the first subset of image files, after the search criteria has been set; and replacing in the second area, the third range with a fourth range of attribute information associated with the second subset of image files, after the search criteria has been set.

7. The method of claim 6, further comprising:

displaying a first set of thumbnails of all of the image files in the first folder, in the first area of the display;

displaying a second set of thumbnails of all of the image files in the second folder, in the second area;

replacing in the first area, the first set of thumbnails with thumbnails of the first subset of the image files, after the search criteria has been set; and replacing in the first area, the second set of thumbnails with thumbnails of the second subset of the image files, after the search criteria has been set.

8. The method of claim 6, wherein the attribute information associated with the image file is a shooting time of the image file;

displaying the first range of attribute information includes displaying the earliest shooting time and the latest shooting time of all of the image files in the first folder;

displaying the third range of attribute information includes displaying the earliest shooting time and the latest shooting time of all of the image files in the second folder;

replacing with the second range of attribute information includes displaying the earliest shooting time and the latest shooting time of the first subset of image files; and replacing with the fourth range of attribute information includes displaying the earliest shooting time and the latest shooting time of the second subset of image files.

9. The method of claim 8, wherein the shooting time consists of the day, month, and year at which the image file was shot.

10. The method of claim 6, wherein the attribute information associated with the image file is a shooting location of the image file;

displaying the first range of attribute information includes displaying a first list of shooting locations of all of the image files in the first folder;

displaying the third range of attribute information includes displaying a third list of shooting locations of all of the image files in the second folder;

replacing with the second range of attribute information includes displaying a second list of shooting locations of the first subset of image files; and replacing with the fourth range of attribute information includes displaying a fourth list of shooting locations of the second subset of image files.

11. The method of claim 10, wherein one or more regional names are displayed instead of lists of locations.

12. The method of claim 6, wherein the attribute information associated with the image file is a rating of the image file;

displaying the first range of attribute information includes displaying a first list of ratings of all of the image files in the first folder;

displaying the third range of attribute information includes displaying a third list of ratings of all of the image files in the second folder;

replacing with the second range of attribute information includes displaying a second list of ratings of the first subset of image files; and replacing with the fourth range of attribute information includes displaying a fourth list of ratings of the second subset of image files.

13. The method of claim 12, wherein the lists of ratings are displayed as ranges of ratings.

14. The method of claim 6, wherein if the search criteria is of the same type of attribute information that is displayed in the first area and the second area then the replacing steps are performed; and if the search criteria is not of the same type of attribute information that is displayed in the first area and the second area then the replacing steps are not performed.

15. A non-transitory computer readable medium encoded with instructions for performing the method of claim 6.

16. The method of claim 6, wherein the plurality of folders includes additional folders; displaying the additional folders in additional areas; displaying additional ranges of attribute information associated with all of the image files in each of the additional folders, in the each additional area associated with each additional folder;

wherein additional subsets of image files are the global subset of image files in each additional folder; and replacing in the each additional area, the each additional range with a range of attribute information associated with the each additional subset of image files, after the search criteria has been set.

17. An apparatus comprising:

a storage unit wherein a plurality of image files are dispersed among a plurality of folders, the plurality of folders comprise a first folder and a second folder, each image file among the plurality of image files has attribute information associated with each image file, a processor; and a display, displaying the first folder, in a first area of the display;

displaying a first range of attribute information associated with all of the image files in the first folder, in the first area of the display; displaying the second folder, in a second area;

displaying a third range of attribute information associated with all of the image files in the second folder, in the second area of the display;

setting a search criteria for the plurality of image files, wherein, the processor determines a global subset of image files are those image files among the plurality of image files that match the search criteria;

wherein, the processor determines a first subset of image files are the global subset of image files that are in the first folder; and wherein, the processor determines a second subset of image files are the global subset of image files that are in the second folder;

replacing in the first area of the display, the first range with a second range of attribute information associated with the first subset of image files, after the search criteria has been set; and replacing in the second area of the display, the third range with a fourth range of attribute information associated with the second subset of image files, after the search criteria has been set.

* * * * *